Figure 1:
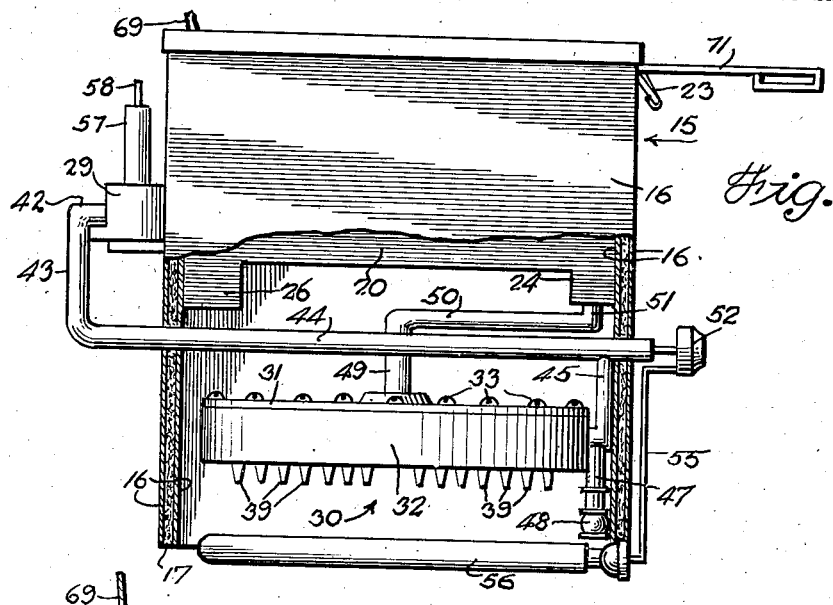

Aug. 27, 1940.  K. P. TOTA  2,212,905
DEEP FAT FOOD FRYER
Filed June 20, 1939  4 Sheets-Sheet 1

Inventor
Kenneth P. Tota
By R. Bryant,
Attorney.

Aug. 27, 1940.　　　K. P. TOTA　　　2,212,905
DEEP FAT FOOD FRYER
Filed June 20, 1939　　　4 Sheets-Sheet 2
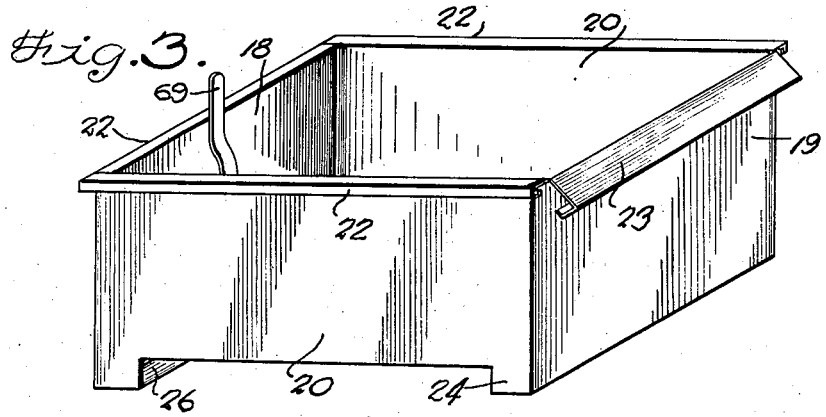
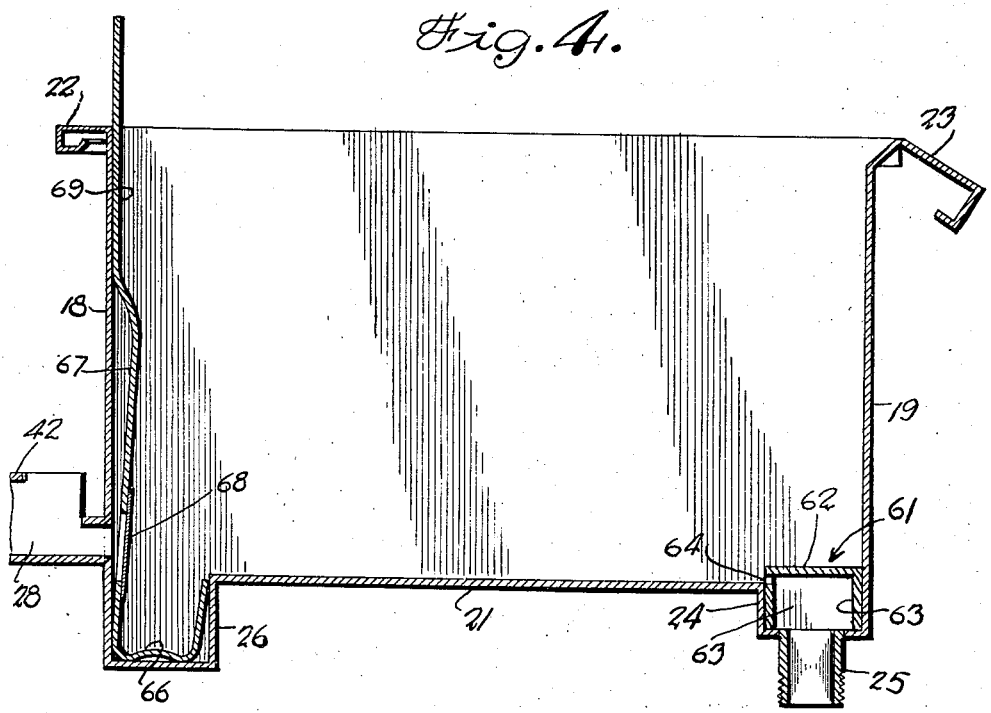
INVENTOR.
Kenneth P. Tota.
BY
ATTORNEY.

Aug. 27, 1940.  K. P. TOTA  2,212,905
DEEP FAT FOOD FRYER
Filed June 20, 1939   4 Sheets-Sheet 3
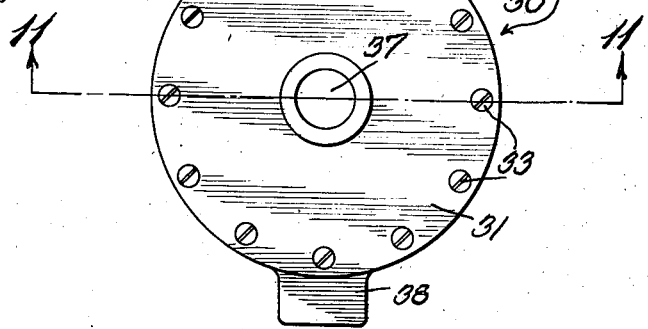
Fig. 8.
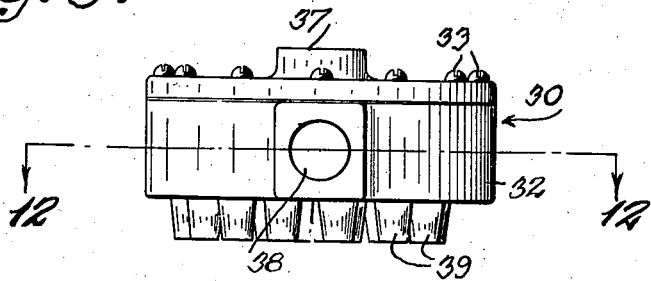
Fig. 9.
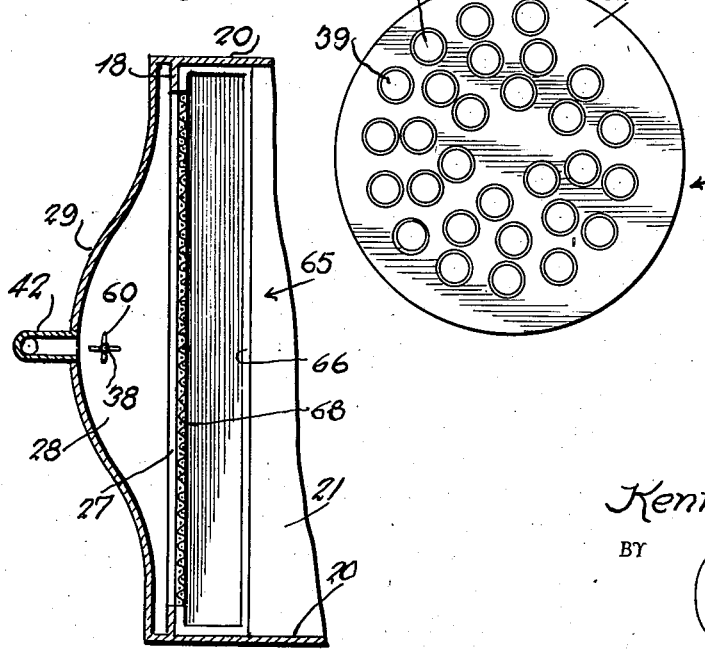
Fig. 5.
Fig. 10.
INVENTOR.
Kenneth P. Tota.
BY
ATTORNEY.

Aug. 27, 1940. K. P. TOTA 2,212,905
DEEP FAT FOOD FRYER
Filed June 20, 1939 4 Sheets-Sheet 4
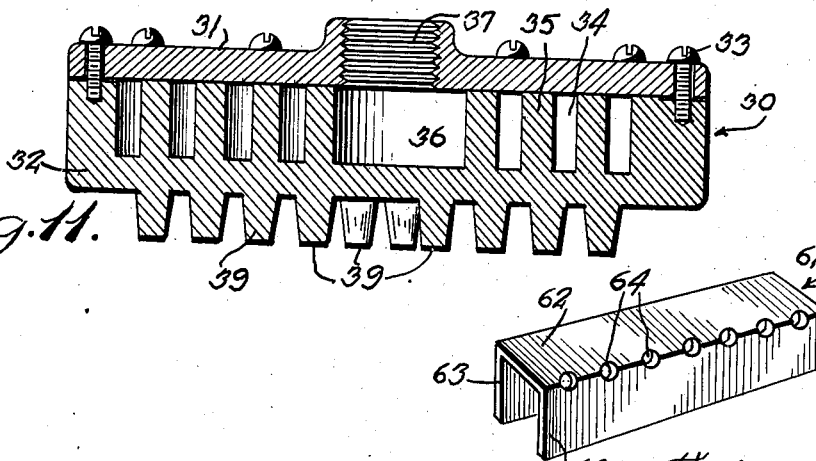
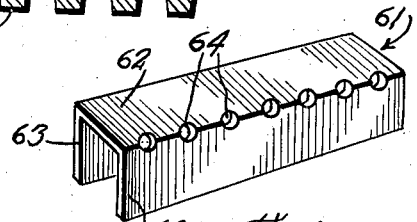
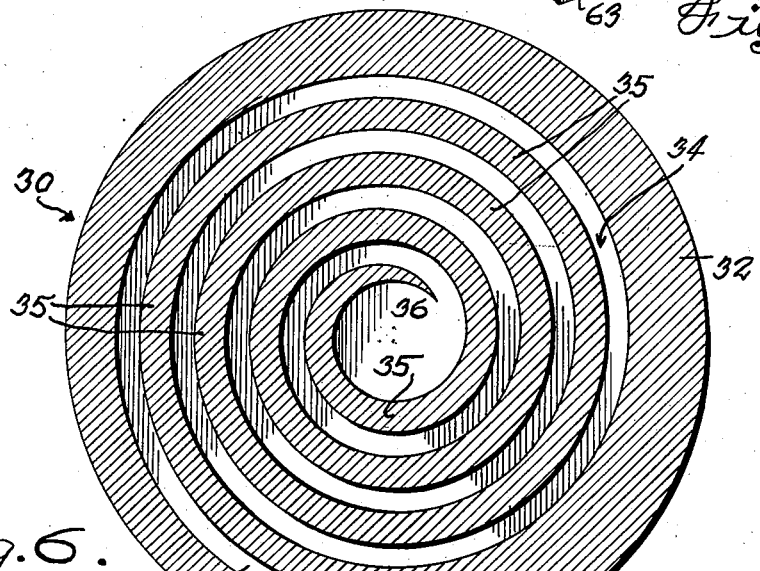
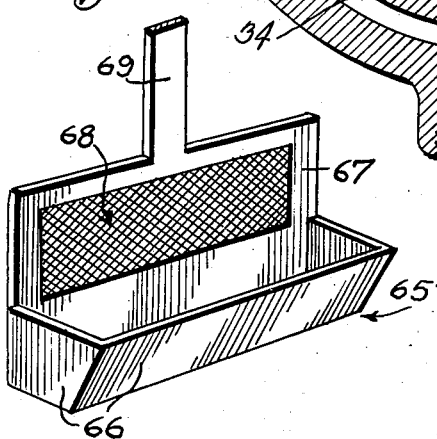
INVENTOR.
Kenneth P. Tota.
BY
ATTORNEY.

Patented Aug. 27, 1940

2,212,905

UNITED STATES PATENT OFFICE 2,212,905

DEEP FAT FOOD FRYER

Kenneth P. Tota, Elmira, N. Y., assignor, by direct and mesne assignments, to Ken-Vic, Inc., a corporation of New York Application June 20, 1939, Serial No. 280,198

8 Claims. (Cl. 53—7)

This invention relates to certain new and useful improvements in deep fat food fryers.

In deep fat food fryers, especially those designed for restaurant use, a vat or kettle in which the fat is placed has a heater associated therewith for raising the fat to the desired cooking temperature, such as will cause the searing of the foods cooked therein as potatoes, meat, fish or other foods, but in the use of such devices the heater is lowered, resulting in the consequent lowering of the temperature of the cooking fat when the fryer is idle. In the foregoing type of deep fat fryer a sediment consisting of particles of food precipitated during the frying operation gathers upon the bottom of the kettle which quickly destroys the purity of the cooking fat as well as forming a substantial insulator between the heating element and the fat in the kettle so that it is necessary when the kettle is idle to maintain a higher degree of heat than would ordinarily be required for maintaining a relatively low temperature in the cooking fat with the result that the overheated fat will quickly deteriorate and render the fat unfit for frying purposes.

It is therefore the primary object of the present invention to provide an improved type of deep fat food fryer that embodies a circulating system for the fat to assure a continuous flow of hot fat to the kettle in which the cooking is being accomplished.

A further object of the invention is to provide a deep fat food fryer wherein the frying vat or kettle has circuitous pipe connections with a fat heating element with a heater disposed beneath said element and thermostatically controlled by the circuitous flow of fat from the kettle to the heating element so that a constant supply of fat heated to the desired cooking temperature flows through the kettle in contact with the food therein for the proper frying of the food as by quickly searing the outer surfaces thereof and prevented from soaking into the food being cooked.

A still further object of the invention is to provide a deep fat fryer of the foregoing character wherein the fat flows in a circuitous path beneath a cooking vat or kettle and a heating element with means in the circuitous system to effect an even distribution of the heated fat over the food being cooked and with means in the circuitous path to extract from the fat all sediment, such as food particles so that the fat remains in a substantially clean and purified condition at all times.

With the above and other objects in view that will become apparent as the nature of the invention is better understood, the same consists in general of certain novel details of construction and combination of parts hereinafter more fully described, illustrated in the accompanying drawings, and claimed.

Figure 2:
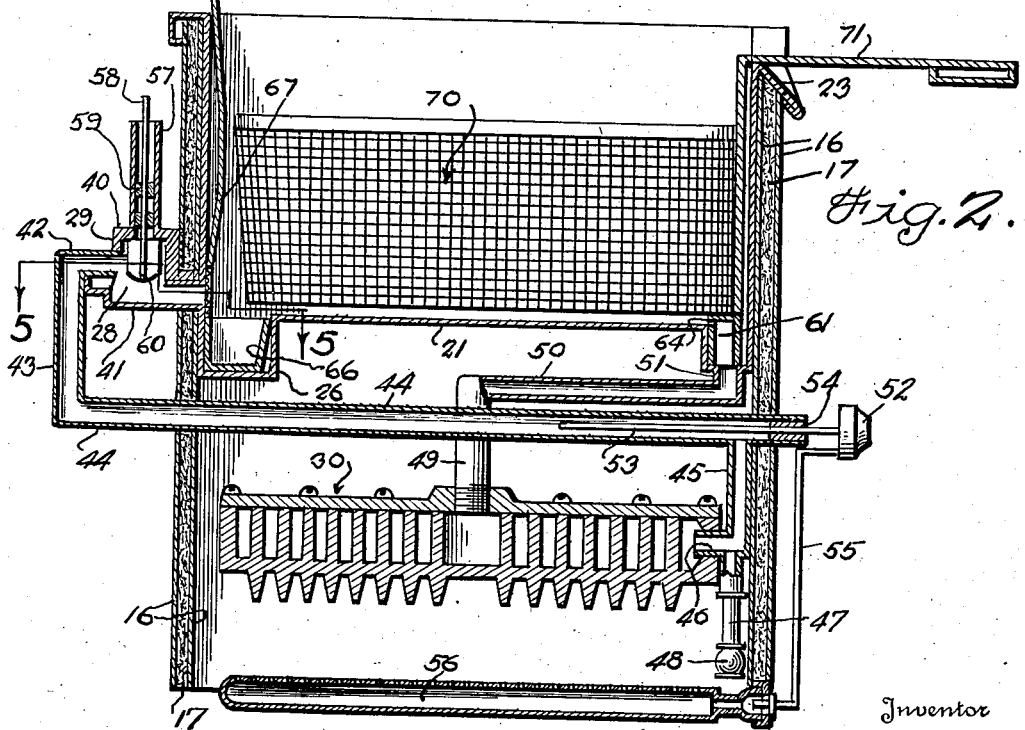

In the accompanying drawings:

Fig. 1 is a side elevational view partly broken away and shown in section of a deep fat food fryer constructed in accordance with the present invention, showing an insulated casing housing a frying vat or kettle, a fat heating element therebeneath, and a heater burner beneath the fat heating element with pipes forming a circuitous connection between the kettle and fat heating element, Fig. 2 is a vertical longitudinal sectional view showing a combination syphon and pump between the fryer kettle and pipe connecting the kettle with the fat heating element, a thermostat in said pipe, a distributor for the returned heated fat, the sediment well in the fryer kettle, and a removable sediment collection tray and fat filter, Fig. 3 is a perspective view of the vat or kettle, Fig. 4 is a vertical longitudinal sectional view of the vat or kettle showing the sediment well and the sediment collection tray and filter in the well, Fig. 5 is a horizontal detailed sectional view taken on line 5—5 of Fig. 2, showing the chamber at the side of the kettle in which the pump is mounted, Fig. 6 is a fragmentary perspective view of the sediment collecting tray and filter screen, Fig. 7 is a perspective view of the device in the kettle for effecting an even distribution in the kettle of the returned heated fat, Fig. 8 is a top plan view of the fat heating element, Fig. 9 is a side elevational view of the fat heating element, Fig. 10 is a bottom plan view of the fat heating element, Fig. 11 is a longitudinal cross sectional view taken on line 11—11 of Fig. 8, showing the removable cover wall for the fat heating element and the heat retainer lugs depending from the bottom wall thereof, and Fig. 12 is a horizontal sectional view taken on line 12—12 of Fig. 9, showing the spiral passage for the fat in the fat heating element.

Referring more in detail to the accompanying drawings, there is illustrated a deep fat food fryer and while the same is illustrated as being of substantially rectangular formation, the same may assume any shape desired and the major portions of the fryer are confined within an insulated casing designated in general by the reference character 15 that comprises a series of spaced walls 16 with an insulation packing 17 between said walls as shown in Figs. 1 and 2, the casing being open at its upper and lower ends.

The frying vat or kettle is mounted in the upper end of the insulated casing 15, and as shown in detail in Figs. 3 and 4, the kettle comprises end walls 18 and 19, side walls 20 and a bottom wall 21, the upper edges of the end wall 18 and side walls 20 being flanged outwardly as at 22 for support upon the upper end of the casing 15, the upper edge of the end wall 19 being flanged outwardly as at 23 for supportingly engaging the adjacent portion of the casing 15 and being designed as shown in Figs. 3 and 4 for the support of cooking utensils such as spoons, forks, ladles or the like. The kettle has a relatively shallow well 24 depending from the bottom wall 21 adjacent the end wall 19 with an externally threaded nipple 25 depending from the bottom of said well between the ends thereof. A relatively deeper well 26 depends from the other end of the bottom wall 21 adjacent the end wall 18 and extends the full width of the kettle and constitutes a sediment well. The lower end of the wall 18 as shown in Fig. 5 is provided with a horizontal slot 27 extending substantially the full width of the kettle so that the kettle through said slot 27 communicates with a chamber 28 bounded by an outwardly arched wall 29 that forms a part of the fat circulating system of the deep fat food fryer.

It is intended that during the frying of food, heated fat continuously flows through the kettle, the fat raised to the desired cooking temperature entering the kettle through the nipple 25 and passing outwardly of the kettle through the slot 27 in the end wall 18 to enter the chamber 28 and to be delivered from said chamber by pipe connections with a fat heating element. The fat heating element, as shown more clearly in Figs. 1, 2 and 8 to 12 and being designated in general by the reference character 30 is formed of top and bottom sections 31 and 32 detachably connected together in a leak-tight manner at their marginal edges by screws 33. The bottom section 32 has a spiral passage 34 formed therein defining spaced ribs 35 that are engaged at their upper ends by the top section 31, the spiral passage 34 terminating at the center of the section 32 in a substantially cylindrical chamber 36 directly beneath an internally threaded boss 37 rising centrally of the top section 31. The outer end of the spiral passage 34 communicates with a laterally extending internally threaded boss 38, the bosses 37 and 38 having pipe sections connected thereto that form communication with the frying kettle.

As shown more clearly in Fig. 10, a spiral series of lugs 39 is formed integral with and projecting downwardly from the lower side of the bottom section 32 of the fat heating element and the lugs of said spiral series are in line with the ribs 35 formed by the spiral groove 34 so that heat imparted to the lugs 39 is quickly transmitted or radiated to the ribs 35 for instantly heating fat flowing through the spiral passage 34.

As shown more clearly in Figs. 1, 2 and 5 the chamber 28 adjacent the end wall 18 of the kettle has in addition to the outwardly arched wall 29, a top wall 40 and a bottom wall 41. A short pipe section 42 is attached to the wall 29 intermediate its ends, the pipe section 42 carrying a depending pipe section 43 exteriorly of the insulated casing 15, while a horizontal pipe section 44 at the lower end of the pipe section 43 passes through the insulator casing 15 beneath the frying kettle and terminates outwardly of the insulated casing at the opposite side thereof. A branch pipe 45 depends from the horizontal pipe section 44 within the insulated casing 15 and has an elbow connection 46 with the internally threaded boss 38 of the fat heating element 30. A sediment pipe 47 depends from the elbow fitting 46 and has a manually controlled valve 48 at its lower terminal end. A pipe section 49 has its lower end engaged with the threaded nipple 37 carried by the top section 31 of the fat heating element 30, the upper end of the pipe section 49 carrying a horizontal pipe section 50 that has an elbow fitting 51 engaged with the nipple 25 beneath the well 24 of the frying kettle.

A thermostat 52 diagrammatically illustrated in Figs. 1 and 2 is disposed exteriorly of the insulated casing 15 in line with the pipe section 44 and has a heat responsive element 53 extending into said pipe section 44 through a packing device 54 in the outer end of the pipe section 44, a gas pipe 55 from the thermostat 52 extending downwardly therefrom exteriorly of the insulated casing 15 and being in communication with a gas burner 56 extending across the lower open end of the insulated casing 15 beneath the fat heating element 30.

When the kettle has been charged with the desired amount of fat for deep fat frying and the burner 56 ignited and the temperature of the fat is to be raised to the desired degree under control of the thermostat 52, the fat flows in a circulatory path through the fat heating element 30 by way of the pipe sections 49 and 50 into the well 24 and through the frying kettle to outlet therefrom through the slotted opening 27 in the end wall 18 and into the chamber 28, the fat then returning to the fat heating element 30 by way of the pipe sections 43, 44, and 45 with a syphoning action. For the rapid rise of the cooking temperature in the fat it is intended that the fat be pumped through the circulatory system and a pump for accomplishing this purpose is shown in Fig. 2 as comprising a tube 57 rising from the top wall 40 of the chamber 28 with a pump rod 58 disposed centrally of the tube 57 and spaced therefrom by the bearings 59, the lower end of the pump rod 58 carrying an impeller 60 for drawing the fat out of the kettle through the slotted opening 27 to flow the same under pressure through the pipe line to the fat heating element 30. The guide tube 57 for the pump rod 58 is of a height greater than the level of the frying fat in the kettle and the fat flowing through the chamber 28 will lubricate the pump rod 58 around the bearings 59 and be prevented from escaping out of the upper end of the guide tube 57. There will be no wear on the pump rod 58 in view of its spacing from the guide tube 57.

To insure an even distribution of the returned heated fat within the frying kettle and over the food therein, there is provided a distributor 61 shown in detail in Fig. 7 as being of inverted U-shape and having a top wall 62 and side walls 63, the distributor 61 being placed in the well 24 as shown in Fig. 2 with a series of openings 64 at one side edge of the top wall 62 directed toward the middle of the kettle as illustrated.

It is also intended that sediment, such as particles of food, be removed from the fat and to accomplish such removal there is provided a sediment tray 65 that is removably mounted in the well 26 of the frying kettle. The sediment tray 65, as shown in detail in Fig. 6, comprises an elongated tray structure 66 extending the full length of the well 26 and having an upstanding back wall 67 overlying the slotted opening 27 with a filter screen 68 set into an opening of the back wall 67 in registry with the slotted opening 27 as shown in Fig. 2. A handle 69 is carried by the upper edge of the back wall 67 of the sediment tray to facilitate placement and removal thereof from the sediment well 26. If desired, for the removal of very fine particles from the fat such as of microscopic characteristics, a filter paper may be placed over the screen 68 and which action will result in the production of a thoroughly clean and purified frying fat.

A screened frying basket 70 having a handle 71 is removably mounted in the frying kettle as shown more clearly in Fig. 2 and the frying basket may be of any construction desired.

The deep fat food fryer is so constructed that the fat is forced by the electrically driven pump from the kettle to the fat heating element and again back to the kettle, the continued movement of the fat preventing the same from becoming too hot at any one given point by providing rapid transmission of heat from the heating element to the food being fried. The syphon action of the fat flowing system is merely used to keep the fat hot while the fryer is not in operation, the lugs 39 depending from the bottom section 32 of the fat heating element absorbing a maximum amount of heat from the burner 56 for transmission to the ribs 35 and the fat flowing through the spiral passage 34 and with the burner 56 turned down, it is possible to maintain the cooking fat at a temperature only slightly below the desired cooking temperature so that upon the increase of heat from the burner 56 the temperature of the fat is rapidly raised to the desired cooking temperature under the control of the thermostat 52 and the heat responsive element 53. The fat flowing from the frying kettle to the fat heating element 30 contacts the heat responsive element 53 of the thermostat for the prompt operation of the latter. When cold food is placed in the kettle, the temperature of the fat automatically drops, but by rapidly forcing the fat through the circulating system to the temperature control thermostat, the fat is instantly reheated in such passage and on its travel back to the kettle. Therefore, fat at the proper cooking temperature is always flowing through the kettle with the result that the foods are quickly seared on their surfaces, the moisture therein converted into steam which in moving toward the surface of the food prevents ingress of fat with the result that the food is cooked with the absorption of a minimum amount of fat and is delivered from the kettle in a substantially fat-free condition.

The construction of the fat heating element is such that the fryer may be operated with a notable saving of fuel. The sediment tray may be removed at will and when desired the valve 48 in the drain pipe 47 may be opened for cleaning purposes, the pipe section 47 and valve 48 being located at the lowest point in the circulatory system for the fat. The insulated casing 15 acts to direct all heat units from the burner 56 into contact with the fat heating element 30 and any heat units that may pass by the fat heating element 30 will rise to contact the bottom wall 21 of the frying kettle.

All possibility of food being grease or fat-soaked or poorly cooked in the machine disclosed in this application has been definitely eliminated. The average thermostatically controlled fryer will fry a small quantity of food with fair results, but if the average fryer was filled with food with only sufficient fat in the fryer to cover the food in the basket, it would function so poorly that the resultant large quantity of food would be grease or fat-soaked and poorly cooked. In the present invention, such a deficiency is overcome by the supplying of heat in a sufficient quantity in the fat so that in effect a constant steam pressure is present within the body of each piece of food being fried which forces the fat to the surface and continues to hold it there, the steam pressure in the food being generated from the natural moisture contained in the food. While the apparatus disclosed herein is defined as a deep fat food fryer, the foods cooked therein are actually steam cooked because the outer surface of the food is almost instantly fat seared with the fat penetrating only a very little distance beneath the surface of the food.

From the above detailed description of the invention, it is believed that the construction and operation thereof will at once be apparent, and while there is herein shown and described the preferred embodiment thereof, it is to be understood that minor changes may be made in the details of construction such as will fall within the scope of the invention as claimed.

I claim:

1. In a deep fat food fryer, a frying kettle, a fat heating element disposed beneath the kettle, circuitous fat flow conduits forming communication between said element and kettle, means in one of said conduits for forcing fat therethrough, heating means for the fat heating element and a thermostatic device in one of said conduits for regulating the heating means, said kettle having a well at each end thereof with which the inlet and outlet fat flow conduits communicate, means in one of said wells for evenly distributing the heated fat throughout the kettle, a removable sediment tray in one of said wells and a screen carried by the tray interposed in the path of flow of the fat from the kettle to the outlet fat flow conduit.

2. In a deep fat food fryer, a frying kettle, a fat heating element disposed beneath the kettle, circuitous fat flow conduits forming communication between said element and kettle, means in one of said conduits for forcing fat therethrough, heating means for the fat heating element and a thermostatic device in the conduit through which the fat flows from said kettle to said fat heating element for regulating the heating means, said kettle having a well at each end thereof with which the inlet and outlet fat flow conduits communicate, means in one of said wells for evenly distributing the heated fat throughout the kettle, a removable sediment tray in one of said wells and a screen carried by the tray interposed in the path of flow of the fat from the kettle to the outlet fat flow conduit.

3. In a deep fat food fryer, a frying kettle, a fat heating element disposed beneath the kettle, circuitous fat flow conduits forming communication between said element and kettle, means in one of said conduits for forcing fat therethrough, heating means for the fat heating element, a thermostatic device in one of said conduits for regulating the heating means and an insulated casing open at the top and bottom thereof surrounding the kettle and fat heating element, said kettle having a well at each end thereof with which the inlet and outlet fat flow conduits communicate, means in one of said wells for evenly distributing the heated fat throughout the kettle, a removable sediment tray in one of said wells and a screen carried by the tray interposed in the path of flow of the fat from the kettle to the outlet fat flow conduit.

4. In a deep fat food fryer, a frying kettle, a fat heating element disposed beneath the kettle, circuitous fat flow conduits forming communication between said element and kettle, means in one of said conduits for forcing fat therethrough, heating means for the fat heating element, a thermostatic device in the conduit through which the fat flows from said kettle to said fat heating element for regulating the heating means and an insulated casing open at the top and bottom thereof surrounding the kettle and fat heating element, said kettle having a well at each end thereof with which the inlet and outlet fat flow conduits communicate, means in one of said wells for evenly distributing the heated fat throughout the kettle, a removable sediment tray in one of said wells and a screen carried by the tray interposed in the path of flow of the fat from the kettle to the outlet fat flow conduit.

5. In a deep fat food fryer, a frying kettle, a fat heating element disposed beneath the kettle, circuitous fat flow conduits forming communication between said element and kettle, means in one of said conduits for forcing fat therethrough, heating means for the fat heating element and a thermostatic device in one of said conduits for regulating the heating means, the fat heating element comprising a member having a spiral passage therein with opposite ends of the passage respectively communicating with the fat flow conduits, a spiral rib forming said passage, a spiral series of heat retaining lugs depending from said element in line with said spiral rib for the rapid transmission of heat to said rib for radiation to the fat flowing through the spiral passage and the heating means being located below the fat heating element.

6. In a deep fat food fryer, a frying kettle, a fat heating element disposed beneath the kettle, circuitous fat flow conduits forming communication between said element and kettle, means in one of said conduits for forcing fat therethrough, heating means for the fat heating element and a thermostatic device in the conduit through which the fat flows from said kettle to said fat heating element for regulating the heating means, the fat heating element comprising a member having a spiral passage therein with opposite ends of the passage respectively communicating with the fat flow conduits, a spiral rib forming said passage, a spiral series of heat retaining lugs depending from said element in line with said spiral rib for the rapid transmission of heat to said rib for radiation to the fat flowing through the spiral passage and the heating means being located below the fat heating element.

7. In a deep fat food fryer, a frying kettle, a fat heating element disposed beneath the kettle, circuitous fat flow conduits forming communication between said element and kettle, means in one of said conduits for forcing fat therethrough, heating means for the fat heating element, a thermostatic device in one of said conduits for regulating the heating means and an insulated casing open at the top and bottom thereof surrounding the kettle and fat heating element, the fat heating element comprising a member having a spiral passage therein with opposite ends of the passage respectively communicating with the fat flow conduits, a spiral rib forming said passage, a spiral series of heat retaining lugs depending from said element in line with said spiral rib for the rapid transmission of heat to said rib for radiation to the fat flowing through the spiral passage and the heating means being located below the fat heating element.

8. In a deep fat food fryer, a frying kettle, a fat heating element disposed beneath the kettle, circuitous fat flow conduits forming communication between said element and kettle, means in one of said conduits for forcing fat therethrough, heating means for the fat heating element and a thermostatic device in the conduit through which the fat flows from said kettle to said fat heating element for regulating the heating means and an insulated casing open at the top and bottom thereof surrounding the kettle and fat heating element, the fat heating element comprising a member having a spiral passage therein with opposite ends of the passage respectively communicating with the fat flow conduits, a spiral rib forming said passage, a spiral series of heat retaining lugs depending from said element in line with said spiral rib for the rapid transmission of heat to said rib for radiation to the fat flowing through the spiral passage and the heating means being located below the fat heating element.

KENNETH P. TOTA.